United States Patent [19]

Klemm et al.

[11] 3,873,596
[45] Mar. 25, 1975

[54] PROCESS FOR PREPARING 1-DIALKYLAMINO-5-DIALKYL-IMONIA-2-CYANO-3-CHLORO-4-AZAPENTA-1,3-DIENE SALTS

[75] Inventors: Kurt Klemm, Allensbach; Erhard Langenscheid, Konstanz, both of Germany

[73] Assignee: Byk-Gulden Chemische Fabrik GmbH, Konstanz, Germany

[22] Filed: Nov. 29, 1972

[21] Appl. No.: 310,295

Related U.S. Application Data

[63] Continuation-in-part of Ser. No. 864,168, Oct. 6, 1969, abandoned.

[30] Foreign Application Priority Data
Oct. 8, 1968  Germany............................ 1801862

[52] U.S. Cl............... 260/465.5 R, 260/240 G, 260/247.5 R, 260/268 CN, 260/293.87, 260/429 C, 260/464, 260/465 E
[51] Int. Cl............................................ C07c 121/02
[58] Field of Search ...... 260/469.5 R, 464, 465.5 P, 260/429 C, 465 E

[56] References Cited
UNITED STATES PATENTS

| | | | |
|---|---|---|---|
| 3,300,526 | 1/1967 | Kirsch............................. | 260/465.2 |
| 3,459,783 | 8/1969 | Budnick.......................... | 260/465.2 |
| 3,523,119 | 8/1970 | Jutz et al........................ | 260/465.5 R |
| 3,538,140 | 11/1970 | Goldschmid et al........... | 260/465.2 X |
| 3,660,463 | 5/1972 | Jaffe et al...................... | 260/465.5 R |
| 3,689,498 | 9/1972 | Leimgruber et al. .......... | 260/465.5 R X |
| 3,709,922 | 1/1973 | Leimgruber et al. .......... | 260/465.5 R |
| 3,742,015 | 6/1973 | Leimgruber et al. .......... | 260/465.5 R X |

OTHER PUBLICATIONS

Kittila, "Dimethylformamide Chemical Uses," Du Pont, 1967, p. 205.

Primary Examiner—Joseph P. Brust
Attorney, Agent, or Firm—Gerard J. Weiser, Esq.; Alfred Stapler, Esq.; Karl L. Spivak, Esq.

[57] ABSTRACT

The preparation of salts of 1-dialkylamino-5-dialkylimonio-2-cyano-3-chloro-4-azapenta-1,3-dienes of the general formula

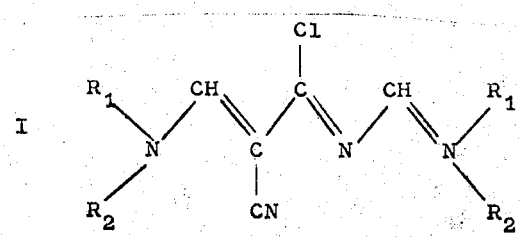

The azapentadiene chlorides prepared are converted into substantially non-water-soluble salts or salts being difficultly soluble in water and thereby precipitated and recovered as disclosed in Ser. No. 674,695, filed September 1967, now U.S. Patent No. 3.523.119 and in Angewandte Chemie 78, 1059 (1966).

The azapentadiene salts obtained by the new process are reacted in accordance with the references cited with amines replacing the chlorine atom in 3-position by an amino group to yield the corresponding 1-amino-1-dialkylaminomethylene amino-3-dialkyliminium-2-cyano propene-(1) compound, subjecting said compound to ring closure with ammonia to form the corresponding 4-amino-5-cyano pyrimidine compound and saponifying the cyano group to the carboxyl group thereby obtaining the well-known 5-pyrimidine carboxylic acids.

13 Claims, No Drawings

PROCESS FOR PREPARING 1-DIALKYLAMINO-5-DIALKYL-IMONIA-2-CYANO-3-CHLORO-4-AZAPENTA-1,3-DIENE SALTS

This application is a continuation-in-part of our application Ser. No. 864,168, filed Oct. 6, 1969, now abandoned.

This invention relates to a new process for the preparation of the salts of 1-dialkylamino-5-dialkylimonio2-cyano-3-chloro-4-azapenta-1,3-dienes of the general formula

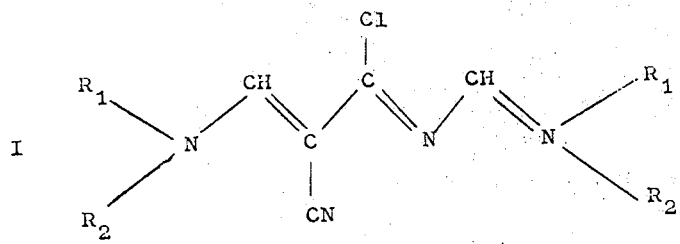

I wherein $R_1$ and $R_2$ are alkyl of 1-6 carbons, cycloalkyl of 3-6 carbon atoms, or taken together with the N atom, $R_1$ and $R_2$ are morpholino, piperidino, piperazino or N-methylpiperazino.

In general the method of preparation comprises reacting cyanoacetamide with a secondary acid amide and an acid chloride delivering chlorine, such as phosphorus oxychloride or phosgene or mixtures thereof at temperatures of about −15°C to about 100°C in the presence or absence of a solvent and isolating and recovering the base as an acid addition salt which is difficultly soluble in water. Instead of the cyanoacetamide, N-cyanoacetyl-N',N'-dialkylformamidine or N-[(α-dialkylaminomethylene)-cyanoacetyl]-N',N'-dialkyl formamidine can be used.

With cyanoacetamide, dialkylformamide and phosphorus oxychloride, the reaction proceeds as follows:

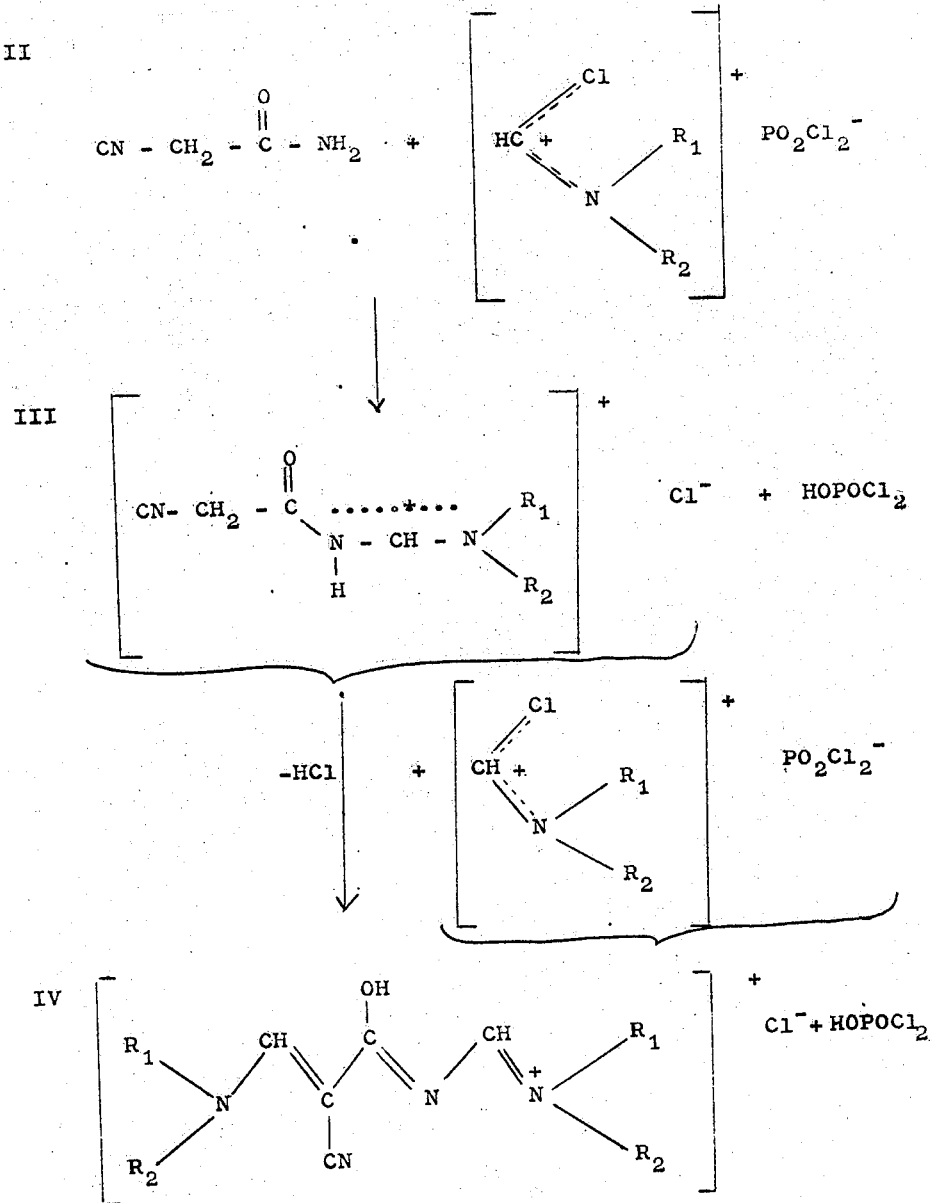

IV 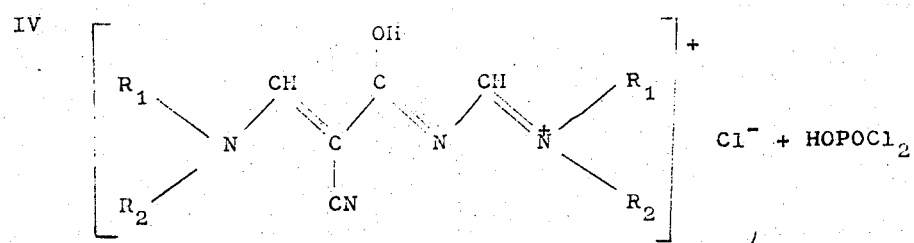

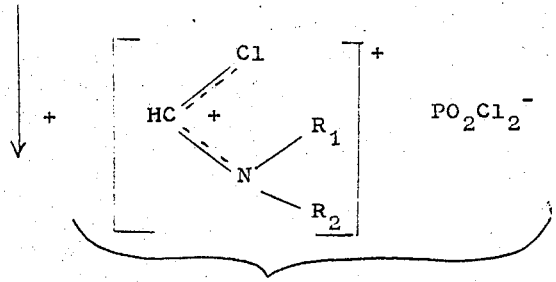

I.S. 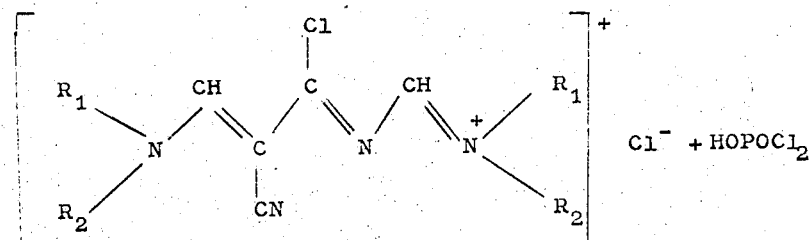

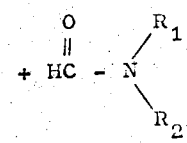

Perchlorate of I wherein $R_1$ and $R_2$ are as defined hereinbefore, formula I.S. being the chloride salt of the azapentadiene of formula I.

The method is carried out with a preferred molar ratio of 1 : 3 – 3.75 : 3 – 3.3 for cyanoacetamide, dialkylformamide and phosphorus oxychloride or phosgene, respectively and gives yields of more than 94 percent of the base which is converted to the acid addition salt, above illustrated as the perchlorate, which is difficultly soluble in water and hence readily recoverable.

The reactions proceed in the presence as well as in the absence of solvents. Halogenated hydrocarbons such as methylene chloride, chloroform, carbon tetrachloride, and 1,2-dichloroethane are particularly useful as well as aromatic solvents, preferably those having a boiling point up to 150°C, such as benzene, chlorobenzene and o-dichlorobenzene. The employment of such solvents favorably influences the yield and the degree of purity of the final product. The combined use of the above-stated molar ratios and the solvents further improves the yields and degree of purity of the final product.

It will be seen from the foregoing that the reaction of the chlorine delivering acid chloride, i.e. phosphorus oxychloride or phosgene, with the dialkylformamide forms the dialkylformamide chloride which together with the remaining phosphorus oxychloride forms a salt-like adduct (formula II). Detailed investigations show that the reaction leads via the salt-like intermediate adduct of N-cyanoacetyl-N'N'-dialkylformamidine (formula III) by reaction with another mole of salt-like adduct of dialkylformamide chloride (formula II) and loss of HCl to another salt-like intermediate adduct, 1-dialkylamino-5-dialkylimonio-2-cyano-3-hydroxy-4-azapenta1,3-diene (formula IV). The latter reacts with another mole of the salt-like adduct of dialkylformamide chloride (formula II) to form the product of formula I.S., which is converted into the perchlorate salt of I.

Thus one variant of the instant method comprises the use of the intermediate, N-cyanoacetyl-N',N'-dimethylformamidine (formula III) in lieu of cyanoacetamide as the initial material. The intermediate compound (formula III) is readily made by the condensation of cyanoacetamide with dimethylformamidedimethylacetal at about 50°C with the removal of the methanol formed.

Yet another variant of the instant method of making the final product comprises the use of the second intermediate, N-[(α-dimethylaminomethylene)-cyanoacetyl]-N',N'-dimethylformamidine (formula IV) as the initial material in lieu of cyanoacetamide. This compound is obtained by the reaction of cyanoacetamide with an excess of dimethylformamide-dimethylacetal at 40°C and good yields are recovered.

For both variants of the process the same modalities of reaction are used as with the use of cyanoacetamide as the initial material, and unusually high yields of the final product are obtained.

1-Dimethylamino-5-dimethylimonio-2-cyano-3-chloro-4azapenta-1,3-diene perchlorate is disclosed in Angewandte Chemie 78, 1059 (1966). According to the process described, malonic acid dinitrile reacts with dimethylformamide chloride in the Vilsmeier formylation, i.e. the formylation of aromatics or heterocycles or of compounds containing activated double bonds, using dialkyl or alkyl aryl formamide in the presence of phosphorus oxychloride or phosgene. Vilsmeier and Haack, Ber. 60, 119 (1927). The final product is recovered in the disclosed process in yields of 81 percent as the crystalline perchlorate.

On the other hand by the instant method yields of 94 percent or more of the final product are obtained. Moreover, the course of the instant method is different from the prior art malonic acid dinitril process, for as seen from the foregoing reaction sequence, the first expected step of the dehydration of the cyanoacetamide to form malonic acid dinitrile, the prior art starting material, does not occur nor does the known reaction sequence theoretically follow it.

The compounds of the invention are highly reactive by virtue of their particular structure wherein a plurality of nitrogen atoms are alternatingly linked to a carbon atom, the ethylenic linkage, and a chloro and a cyano group bonded onto adjacent carbon atoms. Compounds having cyano and/or chloro groups, often also when present in the molecule with double bond unsaturation, are known to have biological activity, such as on bacteria, fungi, insects or on other living organisms wherein they affect the biological system. Such compounds are, therefore, known for their uses in the control os such microorganisms. The compounds of the invention are also highly reactive by virtue of this spacial configuration and reactive groups and linkages to form in a sequence of reactions the well-known 5-pyrimidine carboxylic acids. After having recovered in a known manner [compare U.S. Pat. No. 3,523,119 or Angewandte Chemie 78, 1059 (1966)]the substantially non-water-soluble salts or salts being difficultly soluble in water, such as the perchlorate, picrate, styphnate, picrolonate or hexachloro platinate salt of the azapentadiene, these salts are reacted in accordance with U.S. Pat. No. 3,523,119 and Angewandte Chemie 78, 1059 (1966) with an primary or secondary amine to replace the chlorine atom in 3-position of the azapentadiene salt of formula I by an amino group. The resulting 1-amino-1dialkylamino methylene amino-3-dialkylimini-um-2-cyano propene-(1) compound in turn is reacted with ammonia to form a 4-amino-5-cyano-pyrimidine by ring closure. The 4-amino-5-cyano pyrimidine is converted in the corresponding pyrimidine-5-carboxylic acid having an amino substituent in the 4-position. These compounds are useful antiphlogistic, analgesic, and antirheumatic agents as described in U.S. Pat. No. 3,254,086 and No. 3,254,087.

The following are illustrative but non-limitative examples of the instant method:

EXAMPLE 1

125 parts by weight of phosphorus oxychloride is dropped under agitation into a mixture of 21 parts by weight of cyanoacetamide and 68.5 parts by weight of dimethylformamide within 30 minutes (molar ratio cyanoacetamide : dimethylformamide : $POCl_3$ = 1 : 3.75 : 3.3). Thereafter, the reaction mixture is agitated further for 30 minutes at 50° – 55°C; subsequently, it is cooled down and poured into a mixture of 75 parts by weight of $NaClO_4 \cdot 1H_2O$ and 300 parts by weight of ice. The perchlorate precipitate is sucked off, washed three times with 50 parts by volume of 10 percent aqueous sodium perchlorate solution and dried in vacuo at 20° – 25°C. 24 parts by weight (94.2 percent of the theory) of 1-dimethylamino-5-dimethylimonio-2-cyano-3-chloro-4-azapenta-1,3-diene perchlorate is obtained. The product may be subsequently used without additional purification and has the melting point of 171°C upon recrystallization from acetonitrile/ether (1:1).

The reaction mixture obtained after holding 62.5 parts by weight of phosphorus oxychloride and 10.5 parts by weight of cyanoacetamide and 34.3 parts by weight of dimethylformamide at 50°–55°C for 30 minutes is cooled down and poured into a mixture of 75 parts by weight of sodium hydrogenstyphnate and 1000 parts by weight of ice with agitation. The hydrogenstyphnate is sucked off and repeatedly washed with a saturated sodium hydrogenstyphnate solution. The pure 1-dimethylamino-5dimethylimonio-2-cyano-3-chloro-4-azapenta-1,3-diene hydrogenstyphnate is obtained in a high yield.

EXAMPLE 2

If in lieu of the parts by weight stated in Example 1 21 parts by weight of cyanoacetamide, 45.5 parts by weight of dimethylformamide and 84.5 parts by weight of phosphorus oxychloride (molar ratio 1 : 2.5 : 2.2) are used and the yield of the final product is 60.6 percent of the theoretical. This product is of a purity similar to that of the one prepared according to Example 1.

EXAMPLE 3

By adding 80 parts by weight of chloroform as the solvent, using the ratios of the quantities stated in Example 1, and conducting the preparation in the same manner as in Example 1, a yield of 93.2 percent of the theoretical is obtained.

EXAMPLE 4

In a mixture of 21 parts by weight of cyanoacetamide and 54.7 parts by weight of dimethylformamide, heated to 60°–65°C, under agitation, phosgene is introduced in a strong flow over a period of 6 hours. After this phosgene addition time has elapsed the reaction mixture is additionally stirred for 30 minutes at 70°C, then cooled off and finally poured into a mixture of 75 parts by weight of $NaClO_4 \cdot 1H_2O$ and 300 parts by weight of ice. The perchlorate precipitated is washed and dried, as described in the Example 1. 53.7 parts by weight (68.5 percent of the theoretical) of 1-dimethylamino-5-dimethylimonio2-cyano-3-chloro-4-azapenta-1,3-diene perchlorate is obtained. The product is of a purity similar to that of the one prepared according to Example 1.

EXAMPLE 5

12.8 parts by weight of phosphorus oxychloride are added to the mixture of cyanoacetamide and dimethylformamide, described in Example 4. A yield of 72 percent of the theoretical is obtained.

EXAMPLE 6

14.1. parts by weight of cyanoacetamide and 20 parts by weight of dimethylformamide-dimethylacetal are heated to 50°C for 4 hours under agitation. Upon distilling off the methanol formed the residue is recrystallized from n-butanol. 9.3 parts by weight (40 percent of the theoretical) of N-cyanoacetylN',N'-dimethylformamidine is obtained having a melting point of 164°C.

EXAMPLE 7

20 parts by weight of N-cyanoacetyl-N',N'-dimethylformamidine obtained in Example 6 are heated with 25 parts by weight of dimethylformamide at 40°C. Within 30 minutes, 48.5 parts by weight of phosphorus oxychloride are dropped into the mixture and the reaction temperature is kept at 50°-55°C. After stirring for 30 minutes longer at that temperature, the reaction mixture is cooled off and is poured into a mixture of 30 parts by weight of NaClO$_4$·1H$_2$O and 150 parts by weight of ice. The precipitated perchlorate as described in Example 1 is sucked off, washed and dried. 41.5 parts by weight (92 percent of the theroretical) of 1-dimethylamino-4-dimethylimonio2-cyano-3-chloro-4-azapenta-1,3-diene perchlorate is obtained.

EXAMPLE 8

20 parts of weight of cyanoacetamide are heated with 85 parts by weight of dimethylformamide-dimethylacetal for 90 minutes at 40°C. Upon cooling to 10°C the precipitate is sucked off and the filter residue is washed with petroleum ether (40°-70°C). 41.5 parts by weight (90 percent of the theoretical) of N-[(α-dimethylaminomethylene)-cyanoacetyl]-N',N'-dimethylformamidine is obtained having a melting point of 133°-135°C. The product is dissolved in 200 ml of water and treated with 51 ml of 60 percent perchloric acid. 60.5 parts by weight of N-[(α-dimethylaminomethylene)-cyanoacetyl]-N',N'-dimethylformamidine perchlorate (86.5 percent of the theoretical related to cyanoacetamide) is obtained having a decomposition point of 195°C.

EXAMPLE 9

Into a solution of 20 parts by weight of N-[(α-dimethylaminomethylene)-cyanoacetyl]-N',N'-dimethylformamidine obtained in Example 8 and 9 parts by weight of dimethylformamide in 480 parts by weight of chloroform, is dropped a solution of 18 parts by weight of phosphorus oxychloride in 20 parts by weight of chloroform at 40°C within 30 minutes. After the elapsed time the reaction mixture is further agitated for 30 minutes at 50°-55°C; then the reaction mixture is concentrated by evaporation and the residue is stirred up with 20 parts by weight of NaClO$_4$·1H$_2$O and 100 parts by weight of ice. The perchlorate precipitated is sucked off, as described in Example 1, washed and dried. 28.2 parts by weight (88 percent of the theoretical) of 1-dimethylamino-5-dimethylimonio-2-cyano3-chloro-4-azapenta-1,3-diene perchlorate is obtained.

Instead of dimethylformamide, diethyl, dipropyl, dibutyl formamide, N-formyl morpholine, N-formyl piperidine, and N-formyl-N-methyl piperazine may be used in Example 1 to make the salts of the azapentadienes having the general formula I.

These salts are converted into the difficultly water soluble azapentadiene picrolonates, styphnates, hexachloro platinates and picrates in a known manner. This conversion is normally effected with aqueous solutions of the acid employed or the alkali salt of the acid employed. Therefore perchloric, styphnic, picric, picrolonic or hexachloro platinic acid or their respective alkali salts are used in stoichiometric amounts, the alkali salt being readily soluble in water.

The preferred alkali salts used are the sodium salts, the most preferred sodium salt being sodium perchlorate.

If an acid is used to precipitate the azapentadiene salts being difficultly soluble, after the precipitation step a stoichiometric equivalent of a base, e.g. sodium hydroxide should be used to bind the hydrogen halide formed during the conversion.

What is claimed is:

1. In a method of preparing a water-insoluble azapentadiene of the general formula

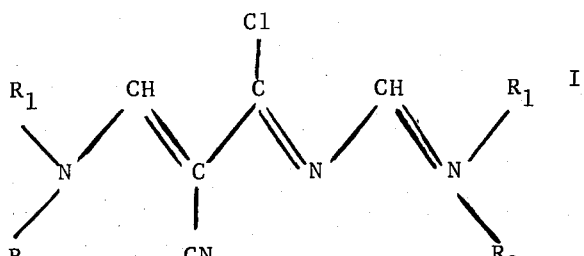

wherein R$_1$ and R$_2$ are alkyl of 1 to 6 carbon atoms, cycloalkyl having 3 to 6 carbon atoms, and recovering said azapentadiene, the improvement which comprises reacting a member selected from the group consisting of cycanoacetamide or a formamidine of the general formulae

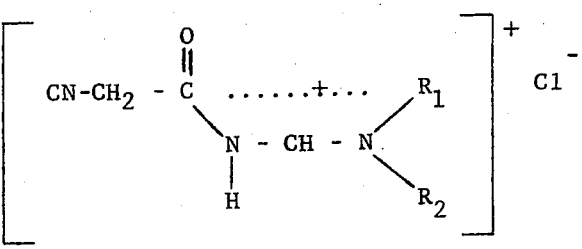

and,

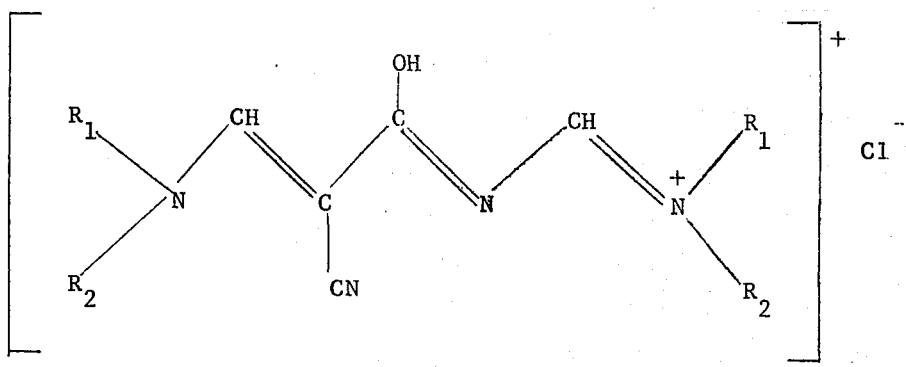

wherein $R_1$ and $R_2$ have the above definition, with a secondary acid amide of the general formula

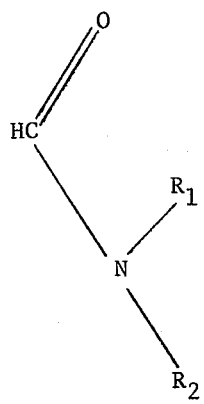

wherein $R_1$ and $R_2$ have the above definition, and a chlorine generating acid chloride at temperatures from about −15°C to 100°C, to form the chloride salt of the azapentadiene of formula I.

2. The method of claim 1 wherein the acid chloride is phorphorus oxychloride or phosgene or mixtures thereof.

3. The method of claim 1 wherein the azapentadiene chloride forming step is carried out in the presence of a halogenated hydrocarbon solvent or an aromatic solvent with a boiling point up to about 150°C.

4. The method of claim 1 wherein the azapentadiene chloride is converted to an azapentadiene perchlorate.

5. The method of claim 1 wherein the defined secondary acid amide is reacted with cyanoacetamide.

6. The method of claim 5 wherein the molar ratio of cyanoacetamide to secondary acid amide to chlorine generating acid chloride is from 1 : 3 − 3.75 to 3 − 3.3.

7. The method of claim 1 wherein the water-insoluble salt recovered is one of the following: perchlorate and picrate.

8. The method of claim 5 wherein said recovering step is carried out with an aqueous solution of sodium perchlorate or perchloric acid.

9. The method of claim 5 wherein the chlorine generating acid chloride is a member selected from the group consisting of phosphorus oxychloride, phosgene or mixtures thereof.

10. The method of claim 5, wherein said recovering step is carried out with a member selected from the group consisting of aqueous perchlorate solution or perchloric acid.

11. The method of claim 5 wherein said azapentadiene chloride forming reaction step is carried out in the presence of a solvent selected from the group consisting of a halogenated hydrocarbon solvent or an aromatic solvent with a boiling point up to 150°C.

12. The method of claim 10 wherein the solvent is selected from the group consisting of methylene chloride, chloroform, carbontetrachloride, 1,2-dichloroethane, benzene, chlorobenzene and o-dichlorobenzene.

13. The method of claim 1 wherein $R_1$ and $R_2$ are both alkyl of 1 to 6 carbon atoms which comprises reacting in an inert solvent selected from the group consisting of a halogenated hydrocarbon and an aromatic hydrocarbon having boiling points up to 150°C at temperatures from − 15°C to 100°C, cyanoacetamide with a dialkylformamide the alkyl group thereof having 1 to 6 carbon atoms and a chlorine generating acid chloride selected from the group consisting of phosphorus oxychloride, phosgene and mixtures thereof in a molar ratio cyanoacetamide : dialkylformamide : acid chloride of 1 : 3 - 3.75 : 3 - 3.3, to form a 1-dialkylamino-5-dialkylimonio-2-cyano-3-chloro-4-azapenta-1, 3-diene chloride.

* * * * *